(12) United States Patent
Glaspie et al.

(10) Patent No.: US 6,527,342 B2
(45) Date of Patent: Mar. 4, 2003

(54) CONE RECLINER/CLUTCH MECHANISM

(75) Inventors: Robert E. Glaspie, Phoenix, AZ (US); Paul A. Elio, Phoenix, AZ (US); Hariharan K. Sankaranarayanan, Scottsdale, AZ (US)

(73) Assignee: Elio Engineering Inc., Phoenix, AZ (US)

( * ) Notice: Subject to any disclaimer, the term of this patent is extended or adjusted under 35 U.S.C. 154(b) by 0 days.

(21) Appl. No.: 09/971,891

(22) Filed: Oct. 5, 2001

(65) Prior Publication Data
US 2002/0041120 A1 Apr. 11, 2002

Related U.S. Application Data
(60) Provisional application No. 60/238,584, filed on Oct. 6, 2000.

(51) Int. Cl.[7] .................................................. B60N 2/22
(52) U.S. Cl. ....................................... 297/373; 297/374
(58) Field of Search ......................... 297/354.12, 364, 297/365, 373, 374

(56) References Cited

U.S. PATENT DOCUMENTS 5,685,610 A * 11/1997 Minai ......................... 297/364

FOREIGN PATENT DOCUMENTS

| DE | 916263 | * | 8/1954 | ................. 297/374 |
| DE | 1914528 | * | 6/1970 | ................. 297/374 |
| DE | 200 00 950 U1 | | 6/2001 | |
| JP | 51624 | * | 4/1977 | ................. 297/373 |

* cited by examiner

Primary Examiner—Peter R. Brown
(74) Attorney, Agent, or Firm—Parsons & Goltry; Robert A. Parsons; Michael W. Goltry

(57) ABSTRACT

A recliner mechanism includes a cylindrical element attached to a back portion and a conically shaped element attached to a seat portion. The cylindrical element has an axially extending central opening formed therein defined by a conically tapered inner surface, and the conically shaped element has an outer surface receivable within the central opening. The conically shaped element is movable in an axially inward direction to a locked orientation with the inner surface of the cylindrical element engaging the outer surface of the conically shaped element to inhibiting relative pivotal movement of the back portion and the seat portion. The conically shaped element is also movable in an axially outward direction to an unlocked orientation with the inner surface of the cylindrical element disengaged from the outer surface of the conically shaped element to permitting relative pivotal movement of the back portion and the seat portion.

18 Claims, 11 Drawing Sheets

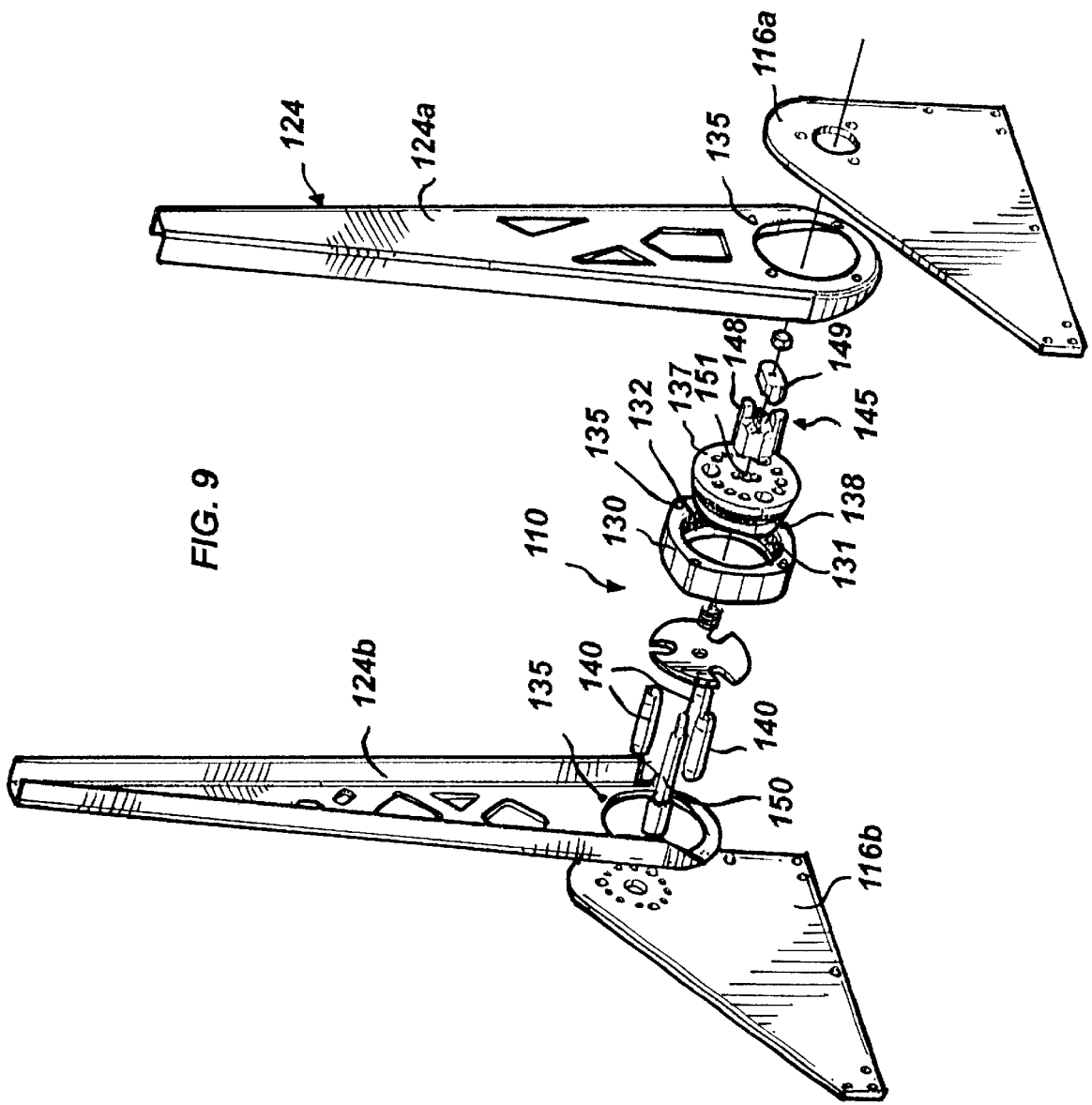

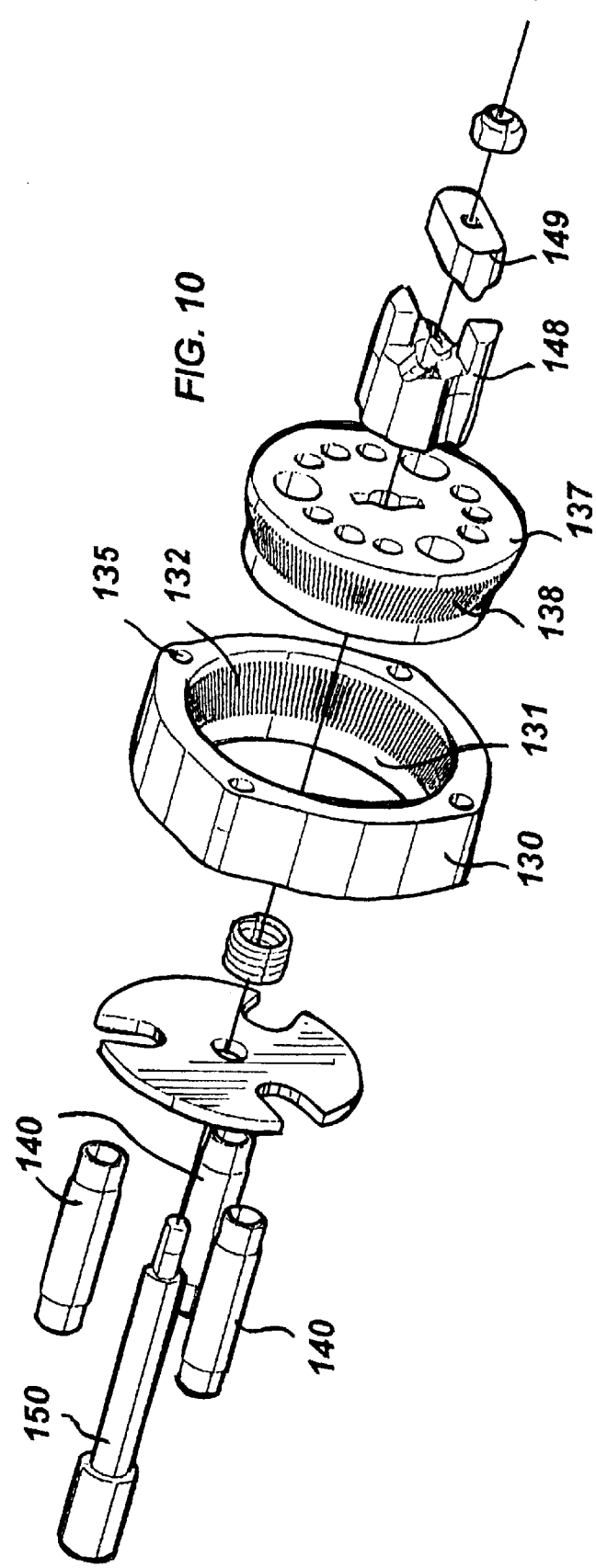

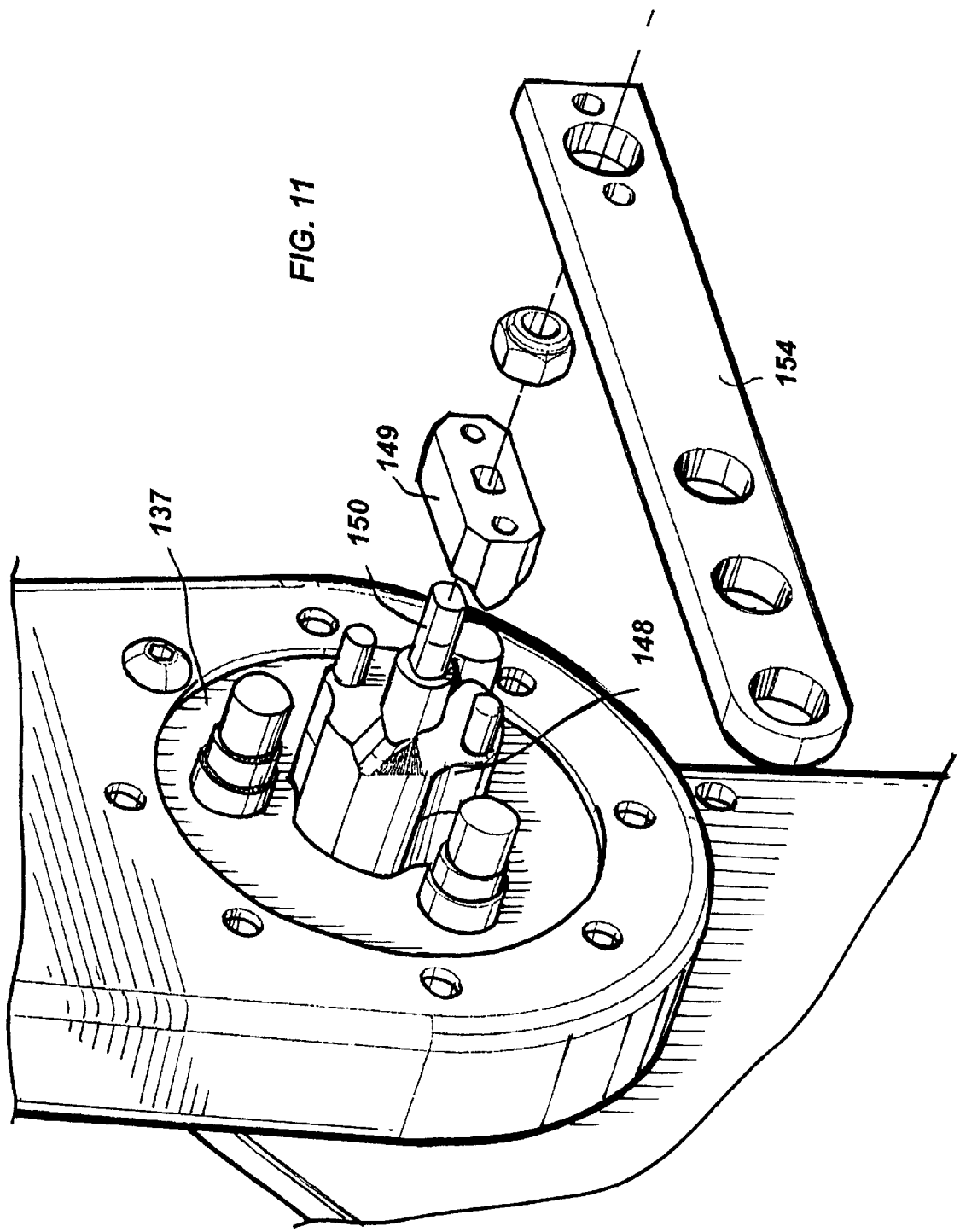

CONE RECLINER/CLUTCH MECHANISM

CROSS-REFERENCE TO RELATED APPLICATION

This application claims the benefit of U.S. Provisional Patent Application Serial No. 60/238,584, filed Oct. 6, 2000.

BACKGROUND OF THE INVENTION

1. Field of the Invention

This invention relates to seating devices.

More particularly, the present invention relates to adjustment mechanisms for seating devices.

In a further and more specific aspect, the present invention concerns adjustment mechanisms for vehicle seating.

2. The Prior Art

Within the art of recliner mechanisms for vehicle seating, many and diverse devices have been developed. These devices often function satisfactorily for the actual reclining function, but function poorly in the area of safety. Typically, when a force of a specific magnitude, such as from a collision, is applied to a seat back, the seat has a catastrophic failure. In other words, the seat back remains more or less rigid and supportive until a certain level of force is exceeded. When this level is reached, the recliner mechanism breaks, letting the seat back pivot unrestrained. When this failure occurs, injury to the occupant of the seat can result. In many automobiles, the space allocated for a recliner mechanism is very limited. By reducing size and cost, current recliner mechanisms are often less than robust and fail at the application of relatively low forces. With the increase of restraint belts, which attach to the seat back, forces applied to the seat back in a collision will only increase.

It would be highly advantageous, therefore, to remedy the foregoing and other deficiencies inherent in the prior art.

Accordingly, it is an object the present invention to provide a recliner mechanism which is extremely rugged and which fixedly holds the seat back relative to the seat portion.

It is another object the present invention to provide an embodiment of the recliner mechanism which clutches under a specified load.

SUMMARY OF THE INVENTION

Briefly, to achieve the desired objects of the present invention in accordance with a preferred embodiment thereof, provided is a recliner mechanism for a seat frame including a back portion and a seat portion. The recliner mechanism includes an internal conically shaped element attached to either the back portion or the seat portion and a mating external conically shaped element attached to the other of the back portion and the seat portion. The inner and outer surfaces of the internal and external conically shaped elements, respectively, can have mating gears formed therein to provide positive braking action or the outer surfaces can be smoother to provide a clutching action. Cam surfaces are provided on an axle for the external conically shaped element and a recliner lever moves the cam surfaces to cam the external conically shaped element into engagement with the internal conically shaped element in a first or locked position and out of engagement in a second or reclining position.

BRIEF DESCRIPTION OF THE DRAWINGS

Specific objects and advantages of the instant invention will become readily apparent to those skilled in the art from the following detailed description of a preferred embodiment thereof taken in conjunction with the drawings, in which:

FIG. 9 is an exploded perspective view of a portion of the seat frame and recliner mechanism of FIG. 8;

FIG. 10 is an enlarged perspective view, similar to FIG. 9, illustrating the various components of the recliner mechanism in more detail; and FIG. 11 is an enlarged perspective view illustrating the camming system of the recliner mechanism of FIG. 8.

DETAILED DESCRIPTION OF THE PREFERRED EMBODIMENTS

Figure 1:
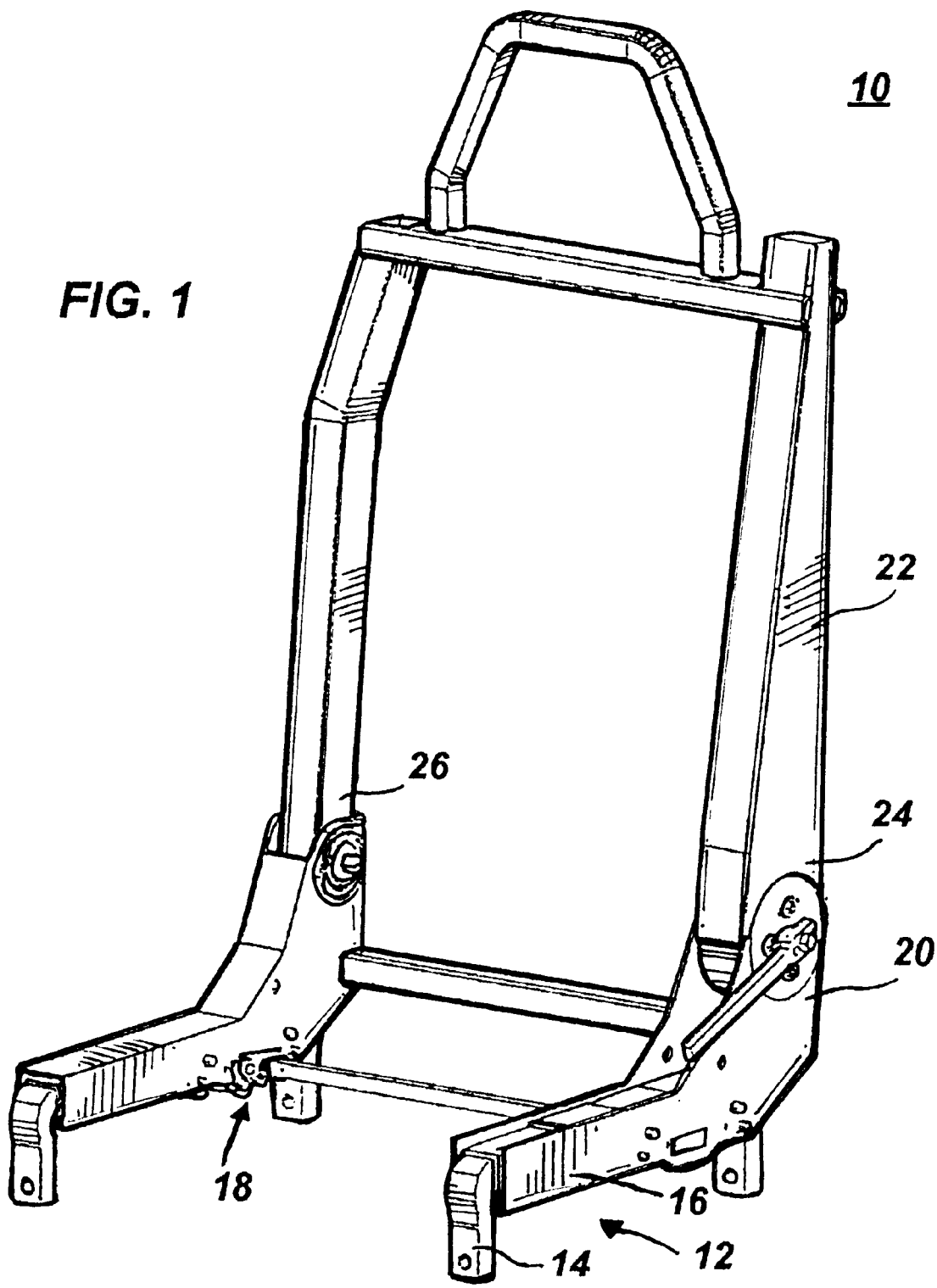
FIG. 1 is a perspective view of a seat frame and recliner mechanism incorporating the present invention.

Turning now to the drawings in which like reference characters indicate corresponding elements throughout the several views, attention is first directed to FIG. 1 which illustrates a seat frame 10 of a seating mechanism for use in vehicles. Seat frame 10 includes a track assembly 12 having an inner track 14 and an outer track 16. Outer track 16 is reciprocally movable upon inner track 14 by employing a latch mechanism 18. Reciprocal movement of outer track 16 permits adjustment of a seat as is commonly employed in commercial and private vehicles. Substantially any latch mechanism can be employed, however in the preferred embodiment, a latch mechanism as disclosed in pending application ADJUSTABLE SUPPORT APPARATUS AND ARCHITECTURE FOR ADJUSTING SUPPORT APPARATUS, Ser. No. 09/092,675, is employed.

Outer track 16 includes a rearward end 20 to which a back frame 22 is pivotally attached. In this embodiment, rearward end 20 is an integral portion of outer track 16. It will be understood that often a back frame is attached to the track via a riser or bracket which is a separate element. This can also be utilized in the present invention. Back frame 22 includes an out board member 24 and an in board member 26. Out board member 24 is pivotally coupled to end 20 on the out board side of track assembly 12 by means of reclining mechanism 28. Reclining mechanism 28 allows for adjustment in the positioning of back frame 22, as will be described in more detail presently. It will be understood by those skilled in the art that while, in the present embodiment, reclining mechanism 28 is coupled to the out board side of seat frame 10 and a free pivot is located on the in board side of seat frame 10, this is simply convention, and they may be reversed as desired.

Figure 2:
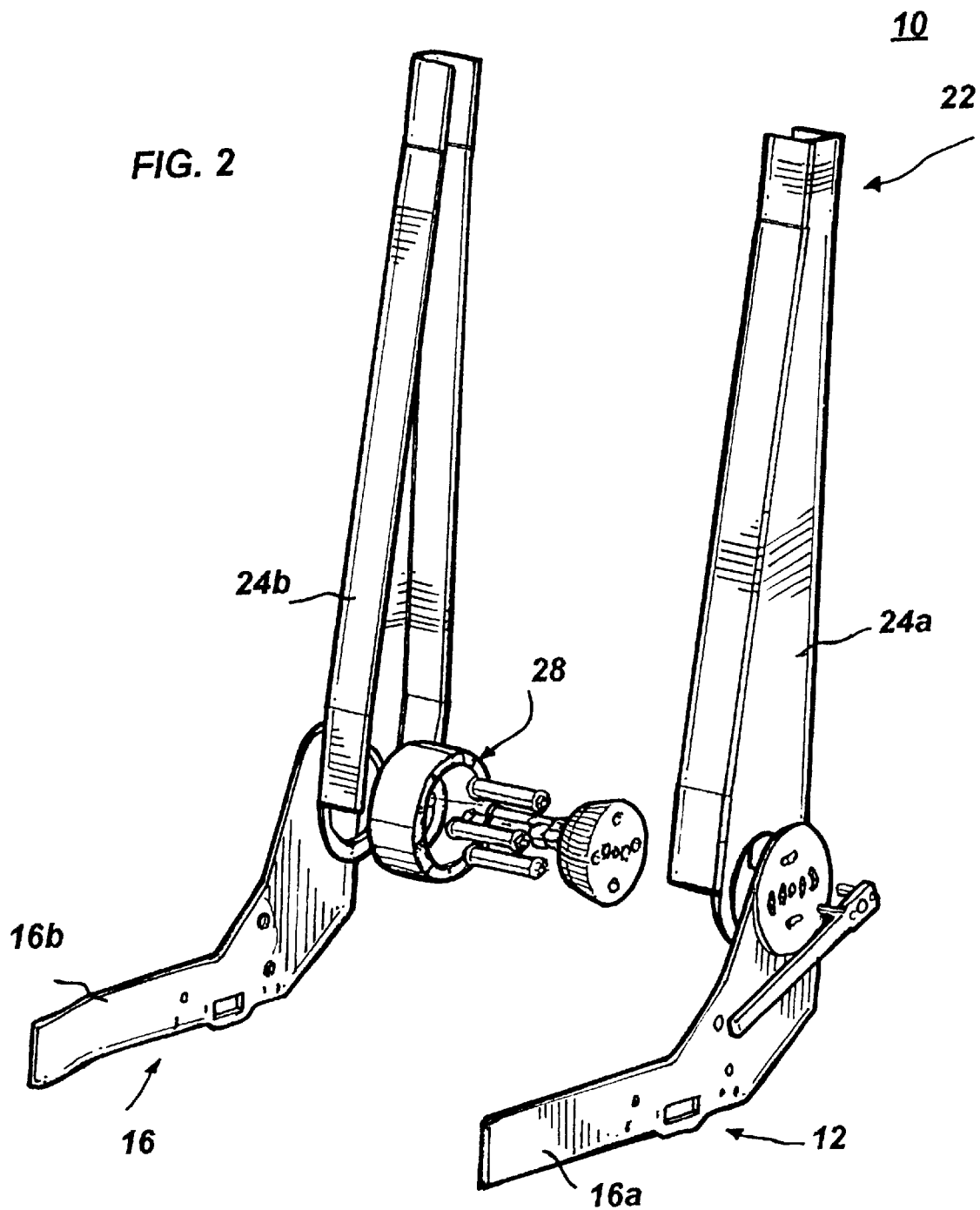
FIG. 2 is an exploded perspective view of a portion of the seat frame and recliner mechanism of FIG. 1.

Turning now to FIG. 2, the out board side of frame 10 and reclining mechanism 28 are shown in an exploded view to better illustrate the various components and their relationships. As can be seen best in FIG. 2, outer track 16 includes an out board member 16a and an in board member 16b, illustrated in an exploded or separated position. Also, outboard member 24 of seatback 22 includes an outer element 24a and a mating inner element 24b, illustrated in an exploded or separated position.

Figure 3:
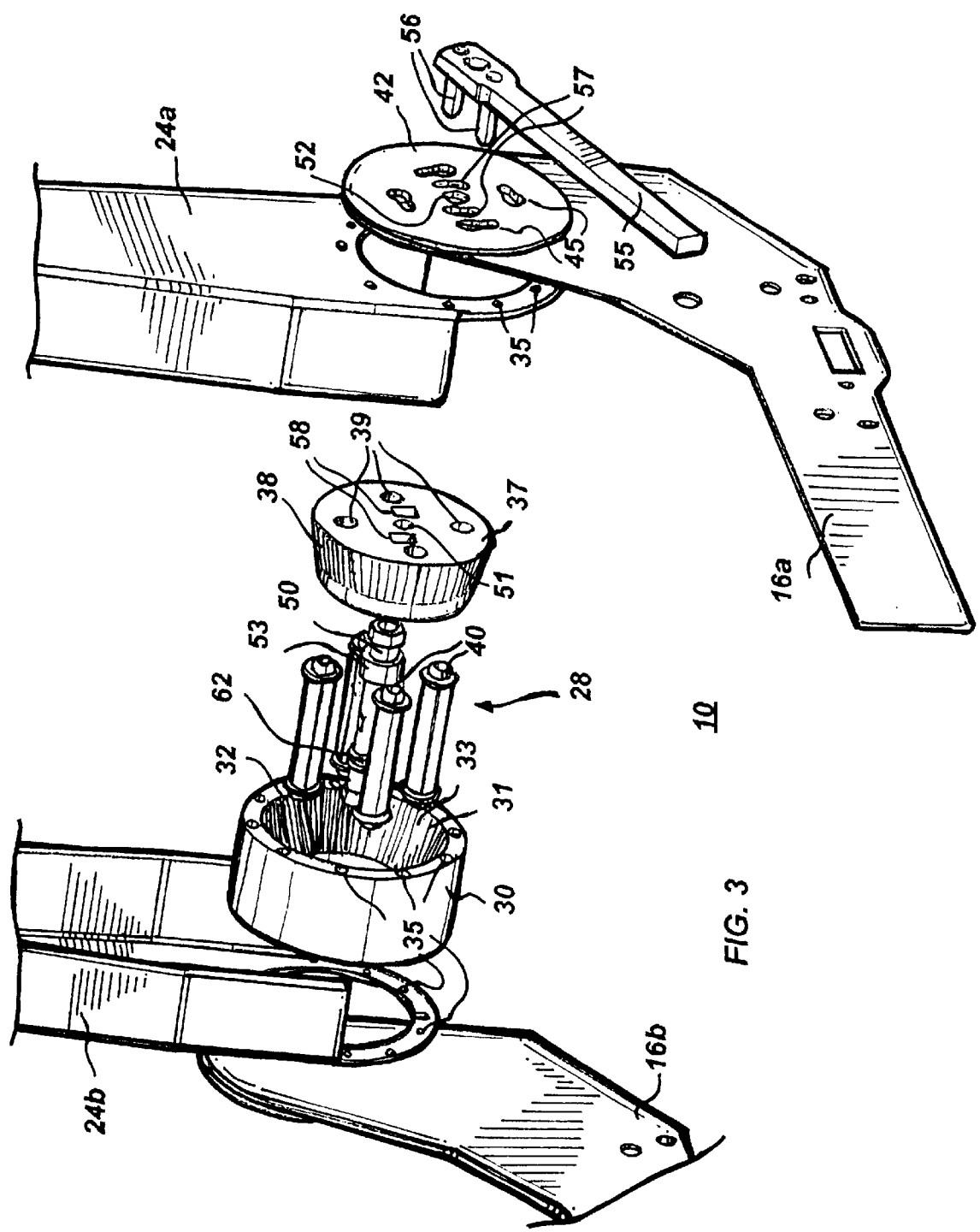
FIG. 3 is an enlarged perspective view, similar to FIG. 2, illustrating the various components of the recliner mechanism in more detail.

Referring additionally to FIG. 3, it can be seen that reclining mechanism 28 includes a cylindrically shaped element 30 having an axially extending central opening therethrough with a conically tapered or shaped inner surface 31. In this embodiment, surface 31 tapers conically from a larger opening at the right side (in FIG. 2 or 3) to a smaller opening in the left side. Also, surface 31 is fabricated with gear-like teeth or ridges (illustrated specifically at 32) in this embodiment to form a positive acting reclining brake mechanism. However, as will be explained in more detail below, surface 31 can be fabricated relatively smooth (as illustrated specifically at 33) to form a clutch type of mechanism. Element 30 is fixedly attached to outer element 24a and inner element 24b of seatback 22 by means of bolts (not shown) extending through holes 35 in outer element 24a, element 30, and inner element 24b.

Reclining mechanism 28 further includes a conically shaped element 37, which in this brake embodiment is fabricated with complemental ridges or gear teeth 38 in the outer periphery thereof. Element 37 is fabricated to be positioned within element 30 so that gear teeth 32 of element 30 mate or mesh with gear teeth 38 of element 37 to positively prevent relative rotary movement between elements 30 and 37. Element 30 is constructed with four holes 39 extending axially therethrough. Four slider pins 40 are provided for mounting element 30 between out board member 16a and in board member 16b.

Figure 4:
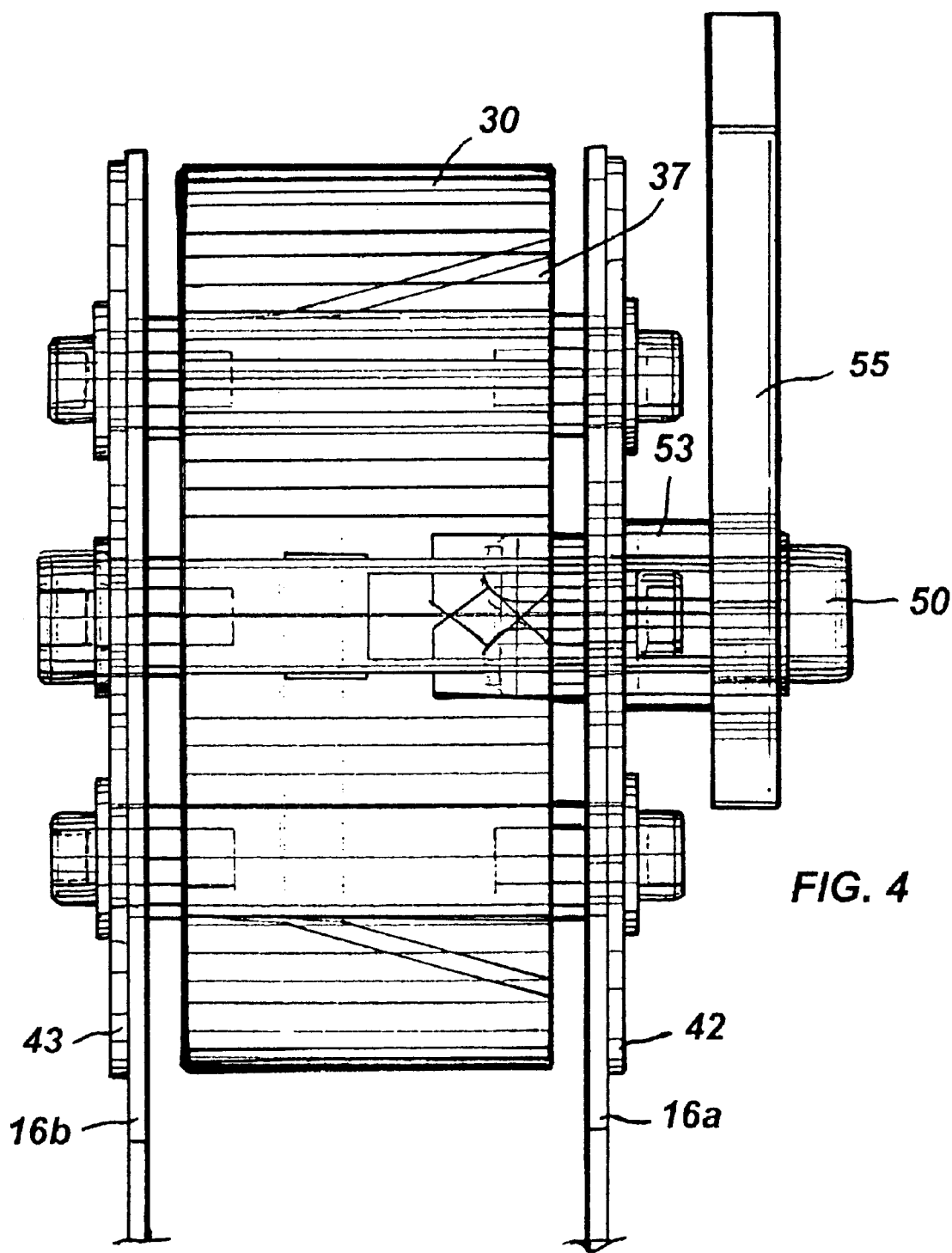
FIGS. 4 and 5 are sectional views of the portion of the seat frame and recliner mechanism illustrated in FIG. 2, in the unlocked and locked orientations, respectively.
Figure 5:
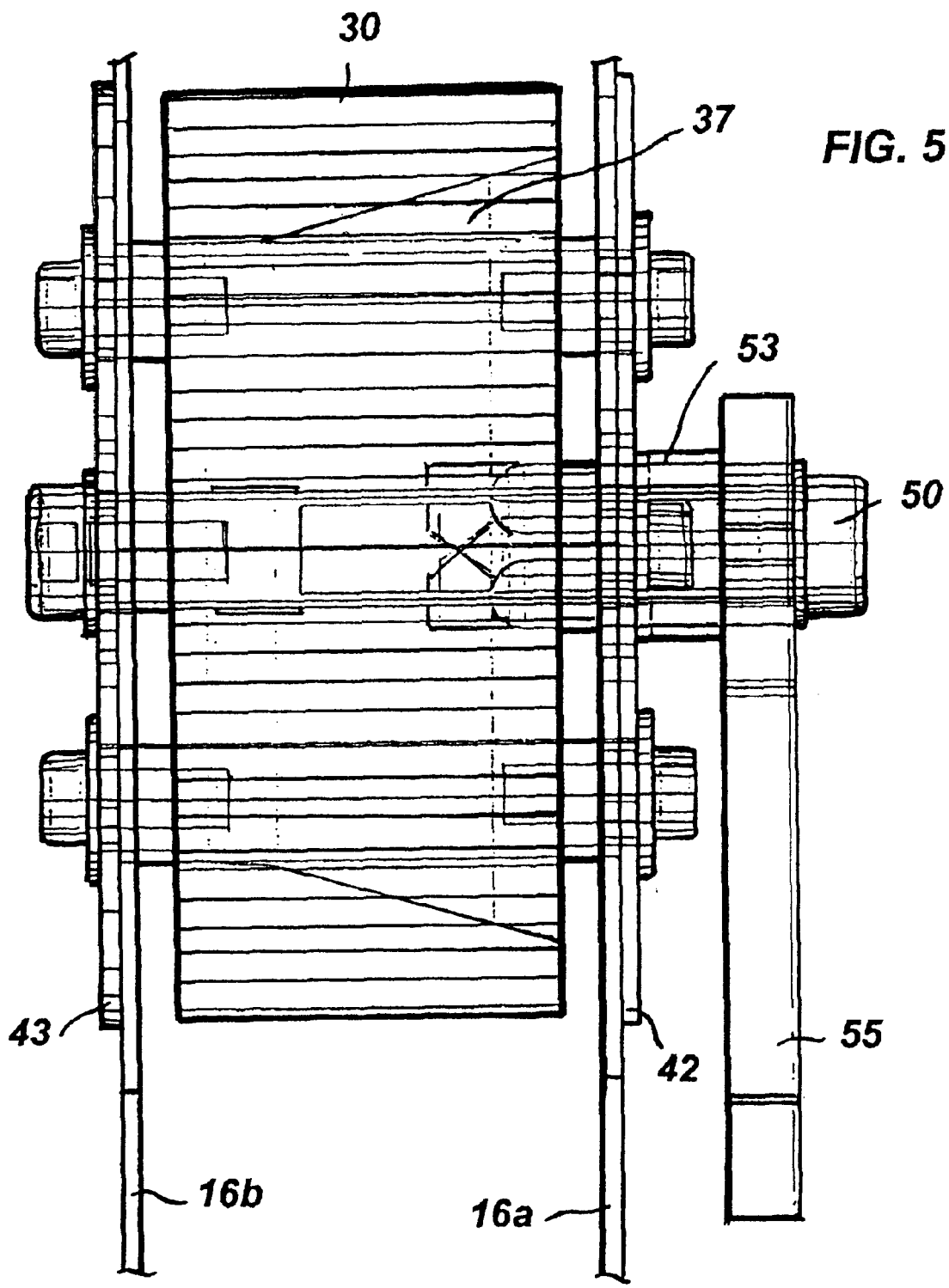

A pair of mounting plates 42 and 43 (see FIGS. 4 and 5) are provided and positioned at the outer surfaces of out board member 16a and in board member 16b, respectively. Mounting plates 42 and 43 each have four slotted holes 45 formed therein with an enlarged portion adjacent one end for receiving slider pins 40 and a smaller portion adjacent the other end. In the assembled orientation, slider pins 40 extend through holes 39 in element 37 and element 37 is positioned coaxially in the opening in element 30. One end of each of slider pins 40 extends through the enlarged portion of slotted holes 45 in mounting plate 42. Also, the other end of each of slider pins 40 extends through the enlarged portion of slotted holes 45 in mounting plate 43. The one or both ends of slider pins 40 are threaded and nuts are engaged to hold the assembly fixedly in place. Mounting plates 42 and 43 may be fixedly attached to members 16a and 16b by some means, such as welding or the like, or they may simply be held in place by slider pins 40 extending through holes in members 16a and 16b.

Here it should be noted that element 37 is shorter, axially, than element 30 and is free to slide axially along slider pins 40 a limited distance. Further, when element 37 is moved axially inwardly the full extent (locked orientation) it is positioned so that gears 33 in element 30 mesh with gears 38 on element 37, and when element 37 is moved axially outwardly the full extent (unlocked or reclining orientation) it is positioned so that gears 33 in element 30 do not mesh with gears 38 on element 37.

An axle 50 is constructed to extend through an axial hole 51 in element 37 and through axial holes 52 in mounting plates 42 and 43. Axle 50 is longer than slider pins 40 so as to extend outwardly from mounting plate 42 a short distance.

A bearing sleeve 53 is positioned coaxially over the outwardly extending end of axle 50 (see FIGS. 4 and 5) and a recliner handle 55 is engaged on axle 50 by means of a nut threadedly engaged on the end of axle 50. Bearing sleeve 53 allows for relative movement between recliner handle 55 and mounting plate 42.

Recliner handle 55 has a pair of inwardly extending pins 56 attached thereto so as to extend through slotted openings 57 in mounting plate 42 and into openings 58 in the end of element 37. Openings 58 have sloping or cam shaped inner surfaces. Also, the inner ends of pins 56 are rounded to form cam engaging surfaces that are positioned to engage the cam shaped inner surfaces of openings 58. The cam surfaces of openings 58 are formed so that as recliner handle 55 is lifted or rotated upwardly (see FIG. 4), element 37 is cammed axially outwardly out of engagement with element 30 and seat back 22 is free to rotate between an upright and a reclining position. Once seat back 22 is positioned in the desired position, recliner handle 55 is lowered or rotated downwardly (see FIG. 5) and element 37 is cammed inwardly into engagement with element 30, which locks seatback 22 positively in the selected position.

In some embodiments it may be desirable to provide a compression spring 62 on axle 50 so as to provide a bias on element 37 tending to force element 37 into the unlocked position. In this embodiment, handle 55 may only cam element 37 into the locked position and, when released, spring 62 biases element 37 into the unlocked position. Here it will be understood that many different types of camming or axial movement systems may be developed to move elements 30 and 37 between locked and unlocked positions and the illustrated systems are simply for exemplary purposes.

Figure 6:
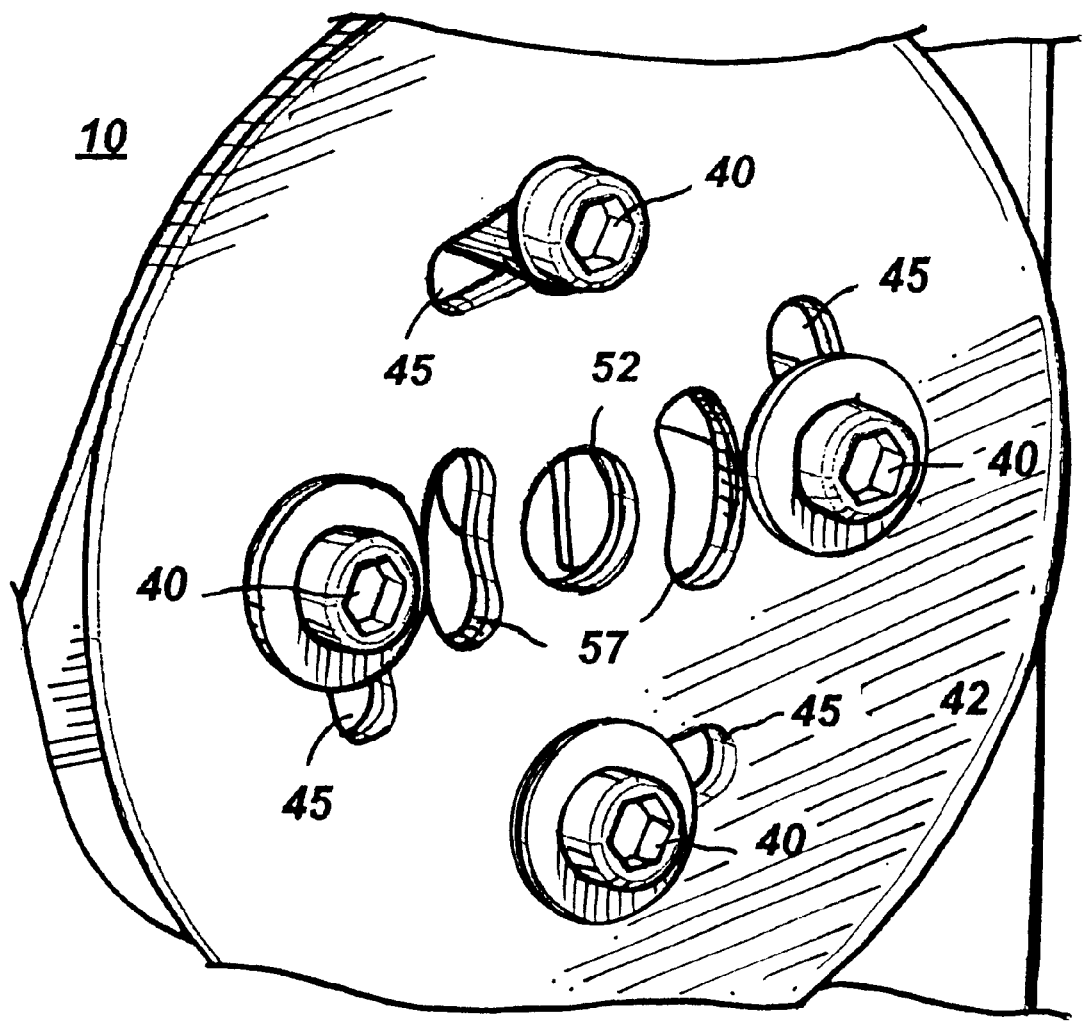
FIG. 6 is a greatly enlarged perspective view of a portion of the recliner mechanism mounting apparatus.

Referring additionally to FIG. 6, a greatly enlarged view of mounting plate 42 and the various openings described above is illustrated. From this view, the orientation of the various openings and the operation thereof can be more fully appreciated.

Figure 7:
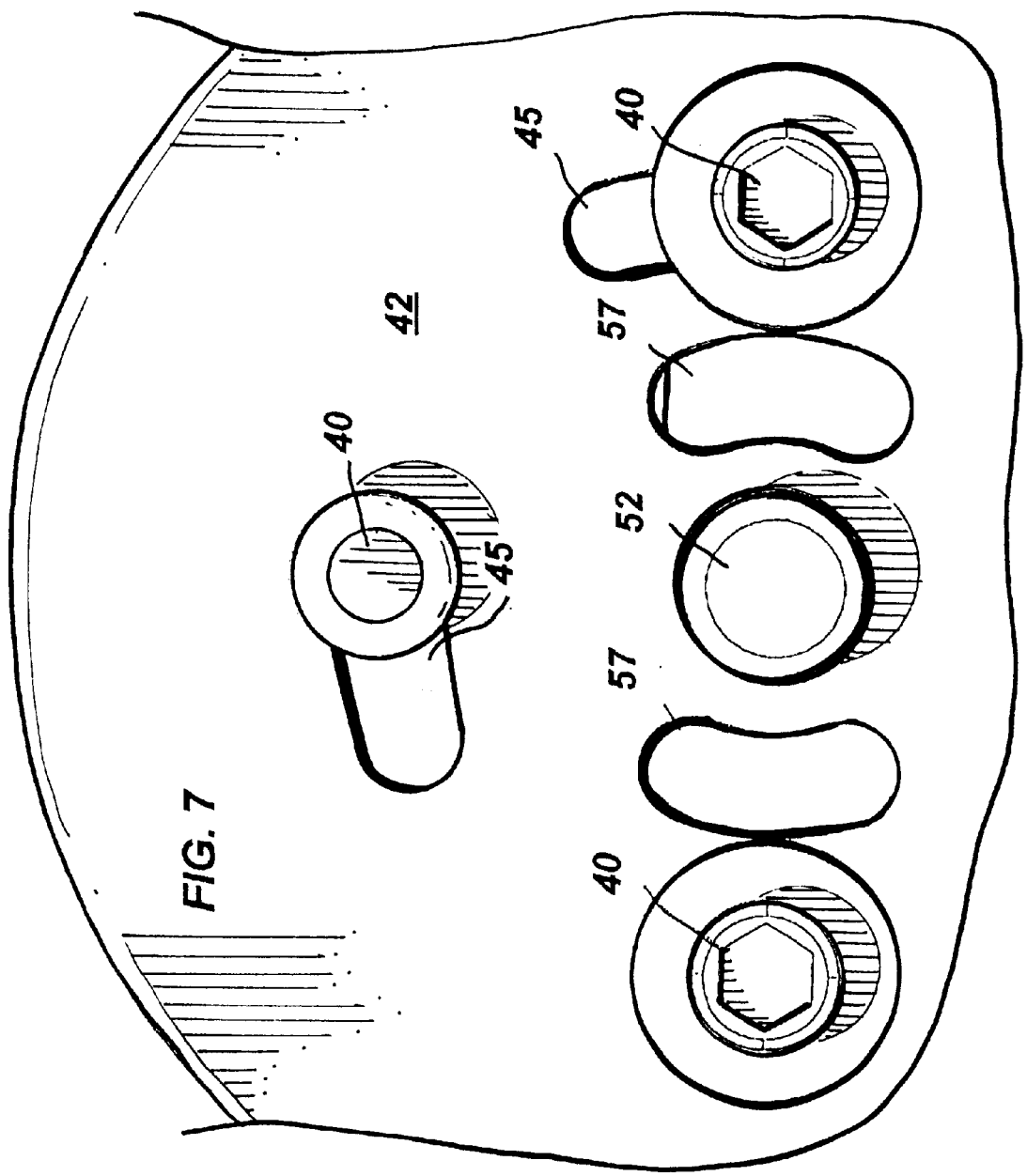
FIG. 7 is a side view of the recliner mechanism mounting apparatus illustrated in FIG. 6, showing an energy absorption feature.

Turning now to FIG. 7, an even greater enlarged view of mounting plate 42 is illustrated. In particular, this view shows one of the slotted holes 45 and an associated slider pin 40 in greater detail. As explained briefly above, at least one of the slotted holes 45 is formed so that the width at one end is approximately equal to the diameter of an associated slider pin 40. However, the width of slotted hole 45 tapers very gradually towards the opposite end so as to be somewhat smaller than the diameter of the associated slider pin 40. Thus, associated slider pin 40 can be easily engaged through the enlarged end of the slotted hole 45 for the assembly of recliner mechanism 10.

Under normal operating conditions or usage, the associated slider pin 40 is firmly attached to mounting plates 42 and 43 through the enlarged end of slotted hole 45. During a forward crash, a large force is applied to the associated slider pin 40 forcing it into the smaller portion of the slot, as illustrated in dotted lines in FIG. 7. As slider pin 40 moves into the smaller portion of slotted hole 45, metal is stretched/compressed/deformed, which translates into substantial energy absorption. Here it will be understood that all four slotted openings 45 can be constructed in this fashion or only the openings extending in the direction of a potential crash.

In a somewhat different embodiment, the inner surface 31 of element 30 is formed so as to be relatively smooth (see surface 33 in FIG. 3). Similarly, the outer surface of element 37 is relatively smooth. In this embodiment, reclining mechanism 10 operates like a clutch, rather than a positive brake. As element 37 is cammed or otherwise moved axially inwardly into engagement with element 30, a frictional engagement between the engaging inner and outer surfaces slows and ultimately prevents relative rotary movement. The "relatively smooth" inner surface of element 30 and the "relatively smooth" outer surface of element 37 could be for example, smooth metal or other hard material, rough metal or other hard material, rubber or other pliable soft material, etc. The amount of clutching movement or braking desired can be provided by the amount of relative axial movement provided between elements 30 and 37.

Figure 8:
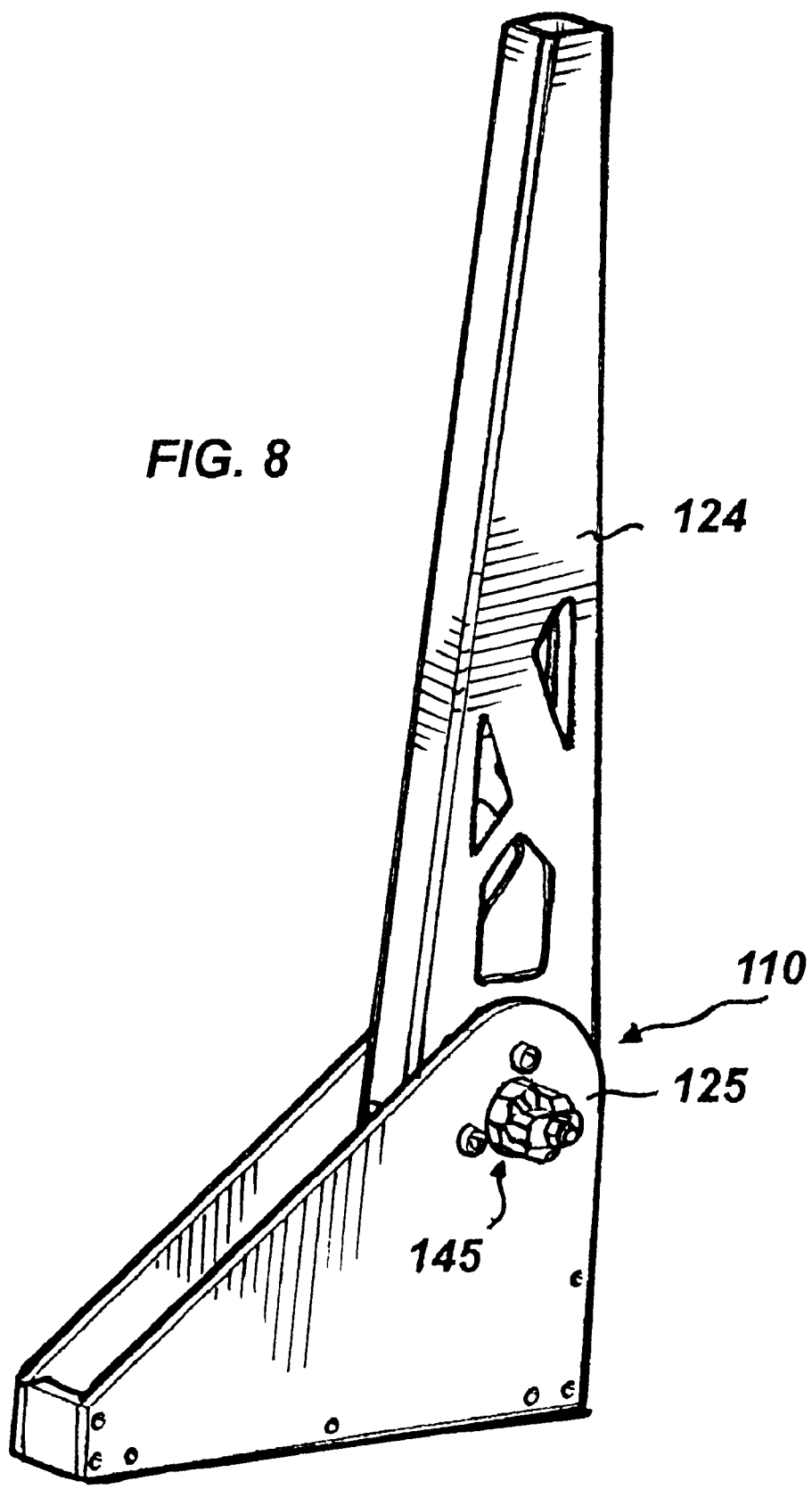
FIG. 8 is a perspective view of one side of a seat frame and recliner mechanism incorporating another embodiment of the present invention.

Turning now to FIG. 8, another embodiment of a recliner mechanism 110 is illustrated. An out board member 124 of a back portion is pivotally coupled to end 125 on the out board side of a seat portion by means of reclining mechanism 110. The back portion and the seat portion are not illustrated in greater detail, as they can be similar to those described in the previous embodiment. Reclining mechanism 110 allows for adjustment in the positioning of the back frame, as will be described in more detail presently. As stated in the previous embodiment, it will be understood by those skilled in the art that while, reclining mechanism 110 is coupled to the out board side of the seat frame, this is simply convention, and reclining mechanism may be reversed as desired.

Turning now to FIG. 9, the out board member 124 and reclining mechanism 110 are shown in an exploded view to better illustrate the various components and their relationships. As can be seen best in FIG. 9, the outboard element of the seat portion includes an out board member 116a and an in board member 116b, illustrated in an exploded or separated position. Also, outboard member 124 of the seatback includes an outer element 124a and a mating inner element 124b, illustrated in an exploded or separated position.

Referring additionally to FIG. 10, it can be seen that reclining mechanism 110 includes a cylindrically shaped element 130 having an axially extending central opening therethrough with a conically tapered or shaped inner surface 131. In this embodiment, surface 131 tapers conically from a larger opening at the right side (in FIG. 9 or 10) to a smaller opening in the left side. Also, surface 131 is fabricated with gear-like teeth or ridges 132 in this embodiment to form a positive acting reclining brake mechanism. However, as will be explained in more detail below, surface 131 can be fabricated relatively smoothly to form a clutch type of mechanism. Element 130 is fixedly attached to outer element 124a and inner element 124b of the seatback by means of bolts (not shown) extending through holes 135 in outer element 124a, element 130, and inner element 124b.

Reclining mechanism 110 further includes a conically shaped element 137, which in this embodiment is fabricated with complemental ridges or gear teeth 138 in the outer periphery thereof. Element 137 is fabricated to be positioned within element 130 so that gear teeth 132 of element 130 mate or mesh with gear teeth 138 of element 137 to positively prevent relative rotary movement between elements 130 and 137. Three slider pins 140 are provided for slidably mounting element 137 between out board member 116a and in board member 116b.

Here it should be noted that element 137 is free to slide axially along slider pins 140 a limited distance. Further, when element 137 is moved axially inwardly the full extent (locked orientation) it is positioned so that gears 133 in element 130 mesh with gears 138 on element 137, and when element 137 is moved axially outwardly the full extent (unlocked or reclining orientation) it is positioned so that gears 133 in element 130 do not mesh with gears 138 on element 137.

An axial movement system is coupled to conical element 137 for moving it between the locked orientation and the unlocked orientation. In this embodiment, the axial movement system includes a cam assembly 145 carried by an axle 150 concurrently extending through the central opening of cylindrical element 130 and an axial hole 151 formed in conical element 137. Shaft or Axle 150 is fixedly attached to in board member 116b and passes through an opening in out board member 116a as can be seen with momentary reference back to FIG. 8.

Referring to FIGS. 10 and 11, cam assembly 145 includes a cam surface 148 slidably carried by axle 150 adjacent conical element 137 and a cam 149 rotatably carried by axle 150 and movable along cam surface 148. As cam 149 is rotated by handle 154, cam surface 148 is forced axially inwardly against conical element 137 moving element 137 into the locked orientation. When the rotation of cam 149 is reversed, element 137 is permitted to return to the unlocked orientation. A disengagement spring 158 is positioned between a back plate 159 and element 137 for biasing element 137 axially outwardly into the unlocked orientation.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A recliner mechanism for a seat frame including a back portion and a seat portion, the recliner mechanism comprising:

a cylindrical element having an axially extending central opening formed therein defined by a conically tapered inner surface, the cylindrical element attachable directly to one of the back portion and the seat portion;

a conically shaped element attachable to the other of the back portion and the seat portion and having an outer surface receivable within the central opening, the conically shaped element movable in an axially inward direction to a locked orientation with the inner surface of the cylindrical element engaging the outer surface of the conically shaped element for inhibiting relative movement of the back portion and the seat portion, and movable in an axially outward direction to an unlocked orientation with the inner surface of the cylindrical element disengaged from the outer surface of the conically shaped element for permitting relative movement of the back portion and the seat portion; and a plurality of slider pins fixable to the other of the back portion and the seat portion for slidably supporting the conical element between the locked orientation and the unlocked orientation.

2. A recliner mechanism as claimed in claim 1 further including ridges extending from the inner surface of the cylindrical element, and complemental ridges extending from the outer surface of the conical element, the ridges and complemental ridges meshingly engaging in the locked orientation.

3. A recliner mechanism as claimed in claim 1 further including an axial movement system for moving the conical element between the locked orientation and the unlocked orientation.

4. A recliner mechanism as claimed in claim 3 wherein the axial movement system includes a cam assembly carried by an axle concurrently extending through the central opening of the cylindrical element and an axial hole formed in the conical element.

5. A recliner mechanism as claimed in claim 4 wherein the cam assembly includes a cam surface slidably carried by the axle adjacent the conical member and a cam rotatably carried by the axle and movable along the cam surface for moving the cam surface axially inwardly and axially outwardly.

6. A recliner mechanism as claimed in claim 4 further including a compression spring carried by the axle, biasing the conical element axially outward into the unlocked orientation.

7. A recliner mechanism comprising:

a back portion pivotally coupled to a seat portion;

a cylindrical element having opposing ends and an axially extending central opening formed therein extending between the opposing ends and defined by a conically tapered inner surface, each of the opposing ends of the cylindrical element attached directly to one of the back portion and the seat portion; and a conically shaped element attached to the other of the back portion and the seat portion and having an outer surface receivable within the central opening, the conically shaped element movable in an axially inward direction to a locked orientation with the inner surface of the cylindrical element engaging the outer surface of the conically shaped element inhibiting relative pivotal movement of the back portion and the seat portion, and movable in an axially outward direction to an unlocked orientation with the inner surface of the cylindrical element disengaged from the outer surface of the conically shaped element permitting relative pivotal movement of the back portion and the seat portion.

8. A recliner mechanism as claimed in claim 7 further including ridges extending from the inner surface of the cylindrical element, and complemental ridges extending from the outer surface of the conical element, the ridges and complemental ridges meshingly engaging in the locked orientation.

9. A recliner mechanism as claimed in claim 7 further including a plurality of slider pins fixed to the other of the back portion and the seat portion for slidably supporting the conical element between the locked orientation and the unlocked orientation.

10. A recliner mechanism as claimed in claim 9 further including an axial movement system for moving the conical element between the locked orientation and the unlocked orientation.

11. A recliner mechanism as claimed in claim 10 wherein the axial movement system includes a cam assembly carried by an axle concurrently extending through the central opening of the cylindrical element and an axial hole formed in the conical element.

12. A recliner mechanism as claimed in claim 11 wherein the cam assembly includes a cam surface slidably carried by the axle adjacent the conical member and a cam rotatably carried by the axle and movable along the cam surface for moving the cam surface axially inwardly and axially outwardly.

13. A recliner mechanism as claimed in claim 11 further including a compression spring carried by the axle, a biasing the conical element axially outward into the unlocked orientation.

14. A recliner mechanism comprising:

a back portion pivotally coupled to a seat portion the back portion including an outer element joined to an inner element;

a cylindrical element having an axially extending central opening formed therein defined by a conically tapered inner surface, opposing ends of the cylindrical element positioned between and attached to the outer element and the inner element of the back portion; and a conically shaped element attached to the seat portion and having an outer surface receivable within the central opening, the conically shaped element movable in an axially inward direction to a locked orientation with the inner surface of the cylindrical element engaging the outer surface of the conically shaped element inhibiting relative pivotal movement of the back portion and the seat portion, and movable in an axially outward direction to an unlocked orientation with the inner surface of the cylindrical element disengaged from the outer surface of the conically shaped element permitting relative pivotal movement of the back portion and the seat portion.

15. A recliner mechanism as claimed in claim 14 further including ridges extending from the inner surface of the cylindrical element, and complemental ridges extending from the outer surface of the conical element, the ridges and complemental ridges meshingly engaging in the locked orientation.

16. A recliner mechanism as claimed in claim 14 wherein the conical element is attached to the seat portion by a plurality of slider pins fixed to the seat portion for slidably supporting the conical element between the locked orientation and the unlocked orientation.

17. A recliner mechanism as claimed in claim 16 wherein the axial movement system includes a cam assembly carried by an axle concurrently extending through the central opening of the cylindrical element and an axial hole formed in the conical element.

18. A recliner mechanism as claimed in claim 17 wherein the cam assembly includes a cam surface slidably carried by the axle adjacent the conical member and a cam rotatably carried by the axle and movable along the cam surface for moving the cam surface axially inwardly and axially outwardly.

* * * * *